US011138878B2

(12) United States Patent
Beattie, Jr. et al.

(10) Patent No.: US 11,138,878 B2
(45) Date of Patent: *Oct. 5, 2021

(54) METHOD AND APPARATUS FOR ENHANCING DRIVER SITUATIONAL AWARENESS

(71) Applicant: AT&T Intellectual Property I, L.P., Atlanta, GA (US)

(72) Inventors: James G. Beattie, Jr., Bergenfield, NJ (US); Jesse Chan, Bothell, WA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/298,700

(22) Filed: Mar. 11, 2019

(65) Prior Publication Data

US 2019/0213878 A1     Jul. 11, 2019

Related U.S. Application Data

(63) Continuation of application No. 15/860,155, filed on Jan. 2, 2018, now Pat. No. 10,269,244, which is a
(Continued)

(51) Int. Cl.
*G08G 1/0967*      (2006.01)
*G06K 9/00*         (2006.01)
(Continued)

(52) U.S. Cl.
CPC ......... *G08G 1/0967* (2013.01); *B60W 40/105* (2013.01); *G06F 3/00* (2013.01);
(Continued)

(58) Field of Classification Search
CPC .......... G08G 1/00; G08G 1/09; G08G 1/0967; G08G 1/0968; G08G 1/23; G08G 1/0137;
(Continued)

(56) References Cited

U.S. PATENT DOCUMENTS 5,699,056 A    12/1997  Yoshida
5,952,941 A     9/1999  Mardirossian et al.
(Continued)

FOREIGN PATENT DOCUMENTS

AU     2008216988 A1    4/2010
CA        2290032 A1    5/2001
(Continued)

OTHER PUBLICATIONS

"Teen Driver Support System", University of Minnesota, Jan. 29, 2015, 3 pages.
(Continued)

*Primary Examiner* — John A Tweel, Jr.
(74) *Attorney, Agent, or Firm* — Guntin & Gust, PLC; Jay Anderson

(57) ABSTRACT

Aspects of the subject disclosure may include, for example, determining, by a system comprising a processor, a driver profile according to a driver identity for a driver of a vehicle, selecting a driver-specific enforcement scenario for the vehicle according to the driver profile and traffic enforcement information that is associated with a vehicle location, and presenting an in-vehicle alert to convey the driver-specific enforcement scenario to the driver. Other embodiments are disclosed.

20 Claims, 6 Drawing Sheets

Related U.S. Application Data continuation of application No. 15/613,975, filed on Jun. 5, 2017, now Pat. No. 9,878,619, which is a continuation of application No. 14/853,183, filed on Sep. 14, 2015, now Pat. No. 9,704,398.

(51) Int. Cl.

| | |
|---|---|
| *G08G 1/01* | (2006.01) |
| *H04W 4/029* | (2018.01) |
| *H04W 4/48* | (2018.01) |
| *B60W 40/105* | (2012.01) |
| *G06F 3/00* | (2006.01) |
| *G06F 21/31* | (2013.01) |
| *G06Q 50/30* | (2012.01) |
| *G08G 1/04* | (2006.01) |
| *G08G 1/0962* | (2006.01) |
| *H04L 29/08* | (2006.01) |
| *G06F 21/30* | (2013.01) |
| *G06F 21/32* | (2013.01) |
| *G06Q 50/00* | (2012.01) |
| *H04W 4/40* | (2018.01) |
| *B60W 40/08* | (2012.01) |
| *G01C 21/36* | (2006.01) |

(52) U.S. Cl.
CPC ............ *G06F 21/305* (2013.01); *G06F 21/31* (2013.01); *G06F 21/32* (2013.01); *G06K 9/00791* (2013.01); *G06K 9/00832* (2013.01); *G06Q 50/01* (2013.01); *G06Q 50/30* (2013.01); *G08G 1/0112* (2013.01); *G08G 1/0129* (2013.01); *G08G 1/0141* (2013.01); *G08G 1/04* (2013.01); *G08G 1/0962* (2013.01); *G08G 1/096716* (2013.01); *G08G 1/096741* (2013.01); *G08G 1/096775* (2013.01); *H04L 67/00* (2013.01); *H04W 4/029* (2018.02); *H04W 4/40* (2018.02); *H04W 4/48* (2018.02); *B60W 2040/0809* (2013.01); *B60W 2040/089* (2013.01); *G01C 21/3691* (2013.01)

(58) Field of Classification Search
CPC ........... G08G 1/0116; G08G 1/096741; G08G 1/052; G06Q 50/265; G01C 21/36; G06F 3/00; G06F 21/305; G06F 21/31; G06F 31/32; B60K 37/00; B60W 40/105; B60W 2555/60; G06K 9/00791; G06K 9/00832; H04W 4/48; H04W 4/029; H04W 4/40; G06T 5/50; H04N 7/181
USPC ........... 340/905, 995.13, 426.19, 426.2, 466; 701/117, 119, 208, 209, 2, 93; 348/135, 348/143
See application file for complete search history.

(56) References Cited

U.S. PATENT DOCUMENTS

| | | | |
|---|---|---|---|
| 6,008,740 A | 12/1999 | Hopkins et al. | |
| 6,502,035 B2 | 12/2002 | Levine et al. | |
| 7,183,942 B2 | 2/2007 | Rock et al. | |
| 7,427,928 B2 | 9/2008 | Crocker et al. | |
| 7,613,564 B2 | 11/2009 | Vorona et al. | |
| 7,617,030 B2 | 11/2009 | Harumoto et al. | |
| 7,872,593 B1* | 1/2011 | Rauscher | G06T 5/50 340/933 |
| 8,022,845 B2 | 9/2011 | Zlojutro et al. | |
| 8,294,594 B2 | 10/2012 | Goudy et al. | |
| 8,296,066 B2 | 10/2012 | Gao et al. | |
| 8,410,794 B2 | 4/2013 | Nakayama et al. | |
| 8,537,033 B2 | 9/2013 | Gueziec | |
| 8,700,293 B2 | 4/2014 | Okude et al. | |
| 8,725,396 B2 | 5/2014 | Guéziec et al. | |
| 8,744,642 B2 | 6/2014 | Smith et al. | |
| 9,082,303 B2 | 7/2015 | Gueziec | |
| 9,171,461 B1 | 10/2015 | Dabell | |
| 9,558,665 B2* | 1/2017 | Wang | G08G 1/017 |
| 9,697,503 B1 | 7/2017 | Penilla et al. | |
| 9,704,398 B2* | 7/2017 | Beattie, Jr. | G08G 1/04 |
| 9,821,763 B2 | 11/2017 | Yuan | |
| 9,878,619 B2* | 1/2018 | Beattie, Jr. | G08G 1/0962 |
| 10,269,244 B2 | 4/2019 | Beattie, Jr. et al. | |
| 2005/0243171 A1* | 11/2005 | Ross, Sr. | G08B 13/19645 348/148 |
| 2007/0067086 A1* | 3/2007 | Rothschild | B60K 31/185 701/93 |
| 2009/0069954 A1* | 3/2009 | Aladesuyi | B60R 25/33 701/2 |
| 2010/0045452 A1* | 2/2010 | Periwal | B60Q 9/00 340/439 |
| 2012/0253607 A1 | 10/2012 | Choi et al. | |
| 2012/0326864 A1* | 12/2012 | Kelsey | H02J 13/0079 340/539.13 |
| 2013/0150004 A1* | 6/2013 | Rosen | H04W 48/04 455/414.1 |
| 2014/0063064 A1 | 3/2014 | Seo et al. | |
| 2014/0195477 A1 | 7/2014 | Graumann et al. | |
| 2014/0236462 A1 | 8/2014 | Healey et al. | |
| 2015/0191178 A1 | 7/2015 | Roy et al. | |
| 2015/0246676 A1 | 9/2015 | Keren | |
| 2016/0086487 A1* | 3/2016 | Abraham | H04W 4/40 340/905 |
| 2016/0232785 A1* | 8/2016 | Wang | G08G 1/096816 |
| 2017/0057492 A1* | 3/2017 | Edgington | B60W 40/08 |
| 2017/0076597 A1 | 3/2017 | Beattie et al. | |
| 2017/0267100 A1 | 9/2017 | Beattie et al. | |
| 2018/0141437 A1 | 5/2018 | Beattie, Jr. et al. | |
| 2018/0174446 A1* | 6/2018 | Wang | G08G 1/017 |

FOREIGN PATENT DOCUMENTS

| | | |
|---|---|---|
| DE | 102011114074 A1 | 3/2013 |
| EP | 1652128 A2 | 5/2006 |
| FR | 2890928 A1 | 3/2007 |
| FR | 2944245 A1 | 10/2010 |
| WO | 2000030058 A1 | 5/2000 |

OTHER PUBLICATIONS

Aliane, Nourdine et al., "A System for Traffic Violation Detection", Sensors, 14, 22113-22127, 2014, 15 pages.
Alterman, Anton, "A piece of yourself: Ethical issues in biometric identification", Ethics and information technology 5.3 (2003): 139-150.
Ante, Spencer E. et al., "Memo to Workers: The Boss Is Watching", Wall Street Journal, 2015, 4 pages.
Herbert, William A. , "No direction home: Will the law keep pace with human tracking technology to protect individual privacy and stop geoslavery", ISJLP 2 (2005): 409.
Miller, Benjamin , "Vital signs of identity [biometrics]", Spectrum, IEEE 31.2 (1994): 22-30.
Ridella, Stephen A. et al., "The Potential for Adaptive Safety Through In-Vehicle Biomedical and Biometric Monitoring", Accessed: Jul. 2015.
Sykora, Robert , "The Future of Autonomous Vehicle Technology as a Public Safety Tool", 2015, http://conservancy.umn.edu/bitstream/handle/11299/172961.
Woodward, John D. , "Biometrics: Privacy's foe or privacy's friend?", Proceedings of the IEEE 85.9 (1997): 1480-1492.

\* cited by examiner

400

METHOD AND APPARATUS FOR ENHANCING DRIVER SITUATIONAL AWARENESS

CROSS-REFERENCE TO RELATED APPLICATIONS

This application is a continuation of U.S. application Ser. No. 15/860,155, filed Jan. 2, 2018 (now U.S. Pat. No. 10,269,244), which is a continuation of U.S. application Ser. No. 15/613,975, filed Jun. 5, 2017 (now U.S. Pat. No. 9,878,619), which is a continuation of U.S. application Ser. No. 14/853,183, filed Sep. 14, 2015 (now U.S. Pat. No. 9,704,398), which are incorporated by reference herein in their entirety.

FIELD OF THE DISCLOSURE

The subject disclosure relates to a method and apparatus for enhancing driver situational awareness.

BACKGROUND

Modern telecommunications systems provide consumers with telephony capabilities while accessing a large variety of content. Consumers are no longer bound to specific locations when communicating with others or when enjoying multimedia content or accessing the varied resources available via the Internet. Network capabilities have expanded and have created additional interconnections and new opportunities for using mobile communication devices in a variety of situations. Intelligent devices offer new means for experiencing network interactions in ways that anticipate consumer desires and provide solutions to problems.

BRIEF DESCRIPTION OF THE DRAWINGS

Reference will now be made to the accompanying drawings, which are not necessarily drawn to scale, and wherein.

DETAILED DESCRIPTION

Figure 1:
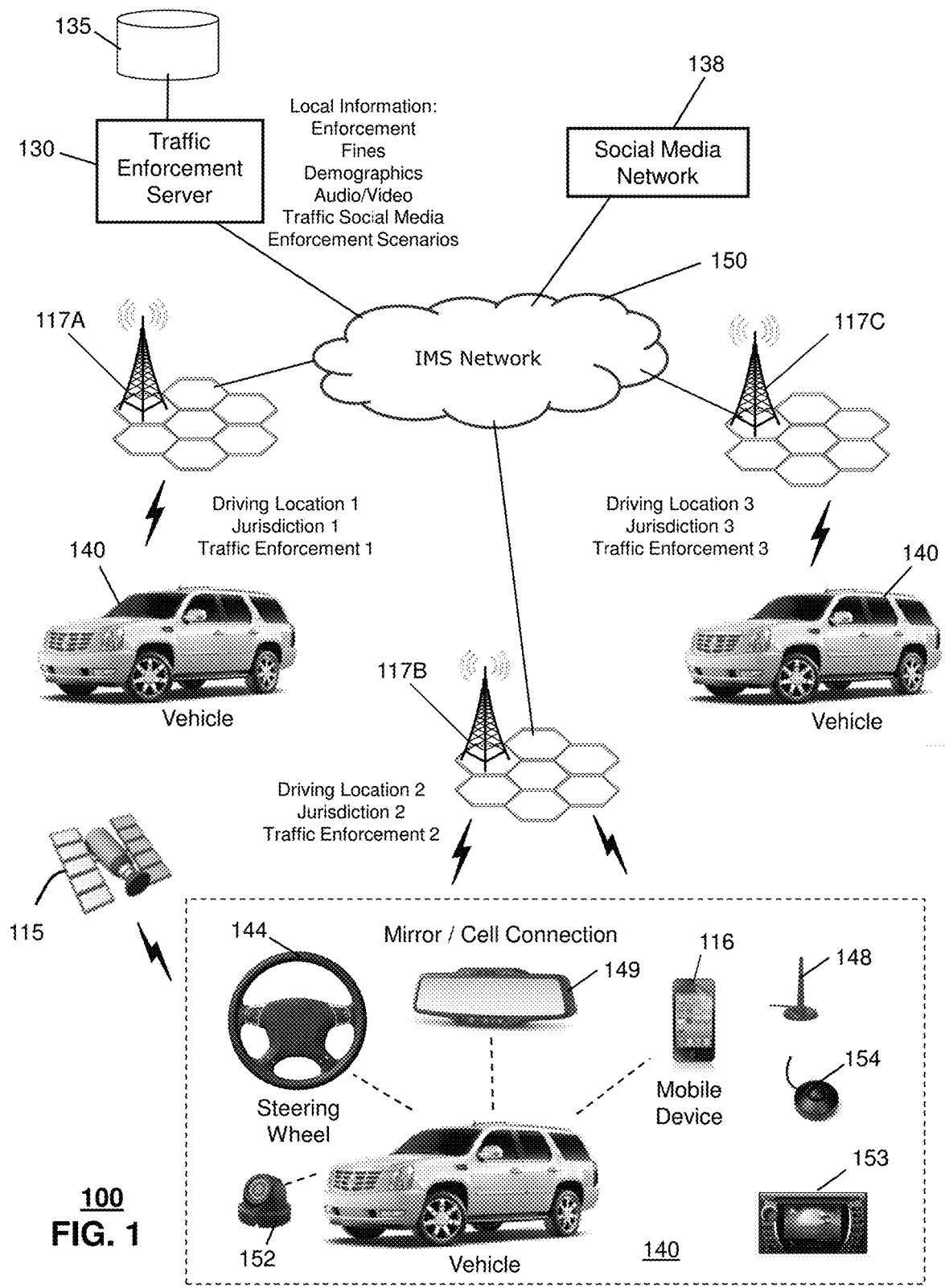
FIG. 1 depicts an illustrative embodiment of a system that can utilized for providing traffic enforcement information to a vehicle.

The subject disclosure describes, among other things, illustrative embodiments for collecting traffic enforcement information and making this information available at the vehicle level that can be used to provide driver awareness as to potential enforcement issues at the current vehicle location. The identity of the driver of the vehicle can be determined so that the traffic enforcement information can be personalized to a driver profile. Positive driver identification can be combined with the traffic enforcement information to select driver-specific enforcement scenarios for the current vehicle location. The driver can be made aware of these enforcement scenarios using in-vehicle communication systems. Vehicle data and social media information can be added to official traffic enforcement information to provide a rich traffic enforcement environmental data system for use in driver awareness activities. Other embodiments are described in the subject disclosure.

One or more aspects of the subject disclosure include a communication device including a memory to store executable instructions and a processor communicatively coupled to the memory. The processor, responsive to executing the executable instructions, can perform operations for determining a driver identity for a driver of a vehicle and, in turn, retrieving a driver profile according to the driver identity. The processor can also perform operations for determining a vehicle location. The processor can further perform operations for accessing, from a network, traffic enforcement information that is associated with the vehicle location and, in turn, selecting a driver-specific enforcement scenario from the traffic enforcement information for the vehicle location according to the driver profile. The processor can perform operations for generating a notification corresponding to the driver-specific enforcement scenario and, in turn, presenting an in-vehicle alert to convey the notification to the driver.

One or more aspects of the subject disclosure include a machine-readable storage medium, including executable instructions that, when executed by a processor, facilitate performance of operations, including sensing biometric information from a driver of a vehicle. The processor can also perform operations for comparing the biometric information to identifying information to determine a driver identity for the driver and retrieving a driver profile according to the driver identity. The processor can further perform operations for accessing, from a network, traffic enforcement information that is associated with a vehicle location. The processor can perform operations for selecting a driver-specific enforcement scenario for the traffic enforcement information for the vehicle location according to the driver profile and, in turn, presenting an in-vehicle alert to convey information associated with the driver-specific enforcement scenario to the driver.

One or more aspects of the subject disclosure include a method including determining, by a system including a processor, a driver profile according to a driver identity for a driver of a vehicle. The method can also include selecting, by the system, a driver-specific enforcement scenario from traffic enforcement information according to the driver profile and a vehicle location for the vehicle. The method can further include presenting, by the system, an in-vehicle alert to convey the driver-specific enforcement scenario to the driver.

FIG. 1 depicts an illustrative embodiment of a system that can be utilized for providing traffic enforcement information to a vehicle. In one or more embodiments, the system 100 can include a communications network 150 for providing cellular/mobile telecommunications, Internet access, and content to consumers. The telecommunication services of the system 100 and the IMS network 150 can be accessed using a variety of communication devices and connectivity schemes. In one embodiment, a mobile communication device 116 can access the IMS network 150 via a mobility network of mobile base stations 117A-117C. In one embodiment, a vehicle 140 can access the IMS network 150 via an in-vehicle cellular connection device 148. In one embodiment, the cellular connection device 148 can be in the form of a stand-alone device or can be integrated into another vehicle function for communicating wirelessly with the IMS network via a mobile base station 117A. In one embodiment, a traffic enforcement awareness server 130 and one or more social network services 138 can access the IMS network 150. In one embodiment, a mobile TTY device can be used in a vehicle 140. The mobile TTY device can communicate wirelessly, such as through a Bluetooth connection, to a cell connection device 148 in the vehicle 140. In one embodiment, the system 100 can include a satellite 115 that can communicate with the vehicle 140.

In one or more embodiments, the system 100 can communicate traffic enforcement information to the vehicle 140 using the IMS network 150. In one embodiment, the traffic enforcement awareness server 130 can be structured as a big data system to collect and analyze a variety of types of information associated with traffic enforcement. In various embodiments, the traffic enforcement server 130 can include federal, state, and local laws, rules, and/or regulations governing traffic. The traffic enforcement awareness server 130 can prioritize traffic regulations to emphasize local and state rules that are specific to particular locations or that are temporary in nature, since such regulations would tend to be less well-known to a driver, who is new to an area or who is entering a driving location on the first day of a new regulation.

In one or more embodiments, the traffic enforcement awareness server 130 can know the current driving location of a vehicle 140 so that the most relevant local driving information is provided to the vehicle 140. For example, the vehicle 140 can determine is current location using a global positioning system (GPS) that operates at the vehicle 140 using information provided by one or more satellites 115. In one embodiment, a vehicle 140 with a self-determining location can communicate its location to the traffic enforcement awareness server 130 via the IMS network 150. For example, the vehicle 140 can communicate establish a communications link with a mobile base station 117C that is near to its current vehicle location. The vehicle 140 can transmit its location to the traffic enforcement awareness server 130 via cellular communication using the mobile base station 117C. In one embodiment, the system 100 can use the mobility network of mobile base stations 117A-117C to determine the approximate location of the vehicle by triangulation of the power of signals received at the vehicle 140 from the nearby mobile base stations 117A-117C or the power of signals received at the nearby mobile base stations 117A-117C from the vehicle 140. For example, a vehicle operating at driving location 1, can receive signals from each of the mobile base stations 117A-117C, where the highest signal power is associated with the nearest mobile base station 117A and the signal powers from the more distant mobile base stations 117B, 117C are comparatively weaker. The vehicle 140 can use this measurement to approximate its positions with respect to the three mobile base stations 117A-117C to conclude that it is located near the first mobile base station 117A that is associated with driving location 1. If the vehicle 140 is further equipped with information, such as a map of locations of mobile base stations 117A-117C, the vehicle 140 can refine its estimation of position by including the locations of each of the mobile base stations 117A-117C and the relative signal strengths into a triangulation calculation for estimating the vehicle location. In one embodiment, the vehicle location can be determined by a wireless communication device 116, such as a mobile phone or smart phone, which is present in the vehicle 140. The wireless communication device 116 can determine its location via GPS or mobile base station signal triangulation.

In one or more embodiments, the traffic enforcement awareness function can be implemented using an in-vehicle wireless communication facility 148, such as a cellular communication device that is built into or retrofitted into the vehicle 140. For example, an in-vehicle wireless communication facility 149 could be activated whenever the vehicle is started or placed into gear. The in-vehicle wireless communication facility 149 can initiate a communication link to a nearby mobile base station 117B upon activation of the facility at vehicle startup. Upon initiation, and thereafter, the in-vehicle wireless communication facility can transmit the current vehicle location to the traffic enforcement awareness server 130 and can receive enforcement information regarding the current location from the traffic enforcement awareness server 130. The in-vehicle wireless communication facility can utilize assets within the vehicle 140, such as a touch screen display 153, an entertainment system, and/or a vehicle navigation system to receive information from the driver of the vehicle 140 and to relay information, notifications, instructions, and/or warnings to the driver. For example, a driver of a vehicle 140 can interact with a touch screen display 153 to provide initialization information, such the driver's identity. The in-vehicle wireless communication facility can transmit this initialization information to the traffic enforcement awareness server 130, where it can be used to tailor a search of traffic enforcement information. This traffic enforcement information can then be transmitted to the vehicle 140 and received by the in-vehicle wireless communication facility 149, which can pass a notification, such as an audio message or a text message, to the entertainment system and/or the touch screen display.

In one or more embodiments, the traffic enforcement awareness function can be implemented using a wireless communication device 116 that is present at the vehicle 140. The traffic enforcement awareness function can be a client application of the wireless communication device 116. The traffic enforcement awareness function can be activated manually by the driver. In one embodiment, the traffic enforcement awareness function can be automatically activated by the wireless communication device 116 whenever a wireless connection is established between the wireless communication device 116 and the vehicle 140. For example, when the vehicle 140 is started, a vehicle entertainment system and/or touch screen display device 153 can automatically initiate a BlueTooth™ connection with the wireless communication device 116 (if the wireless communication device 116 is in close proximity). Upon sensing the BlueTooth™ connection with the vehicle 140, the traffic enforcement awareness function client in the wireless communication device 116 can startup and initiate a wireless connection to the traffic enforcement awareness server 130 via the IMS network 150. The wireless communication device 116 can request identification information from the driver, either directly through the touch screen display, camera, and/or microphone facilities of the wireless communication device 116, or by capturing the identification information indirectly via the BlueTooth™ connection using a facility of the vehicle, such as the vehicle touch screen display 153, vehicle entertainment system, and/or vehicle camera 152. The wireless communication device 116 can transmit this initial information to the traffic enforcement awareness server 130 via cellular connection to the IMS network 150 and can receive traffic enforcement information and notifications from the traffic enforcement awareness server 130 from the IMS network 150. The wireless communication device 116 can present audio and/or visual traffic enforcement information directly, using its own display and audio reproduction capabilities or can forward this information using the BlueTooth™ connection to a vehicle-based facility, such as the vehicle entertainment system, for reproduction.

In one or more embodiments, the traffic enforcement awareness server 130 can use a big data approach to generate a rich description of the entire traffic enforcement environment at the current driving location. In one or more embodiments, the traffic enforcement awareness server 130 can collect information from local, state, regional, and/or national databases. For example, the traffic enforcement awareness server 130 can collect information associated with traffic law enforcement, tickets, fines, and judicial penalties associated with enforcement. The traffic enforcement awareness server 130 can track collect information regarding times of day of enforcement, enforcement locations, enforcing authorities (e.g., local police, sheriff departments, state police), specific officers, demographics of citizens ticketed and/or fined, warnings issued, types of vehicles subjected to enforcement, and/or ticket types (e.g., miles per hour over limit, failure to signal, reckless driving). In one embodiment, the traffic enforcement awareness server 130 can analyze the collected information to detect patterns of traffic law enforcement, which can highlight specific areas where enforcement is highest (e.g., speed traps), where enforcement appears to be skewed by demographic matters (e.g., profiling), where enforcement penalties appear to be excessive (e.g., traffic fines used to fund local police budget), and/or where enforcement activities have recently changed (e.g., location of a weekend sobriety check).

In one or more embodiments, the traffic enforcement awareness server 130 can collect traffic enforcement information from social media networks 138. For example, local police departments can post information on social media sites highlighting specific enforcement activities, points of emphasis, or locations. If a local police department is stepping up enforcement of seatbelt rules or is targeting a particular city street for speeding or running of red lights, then the local department may post this information to social media in an effort to maximize awareness. In another example, citizen groups can use social media sites or stand-alone websites to highlight particular traffic enforcement areas of concern. A drunk driving prevention group can, for example, highlight local enforcement activities targeting driving under the influence of alcohol or drugs. An anti-discrimination organization can, for example, post information highlighting locations where traffic enforcement appears to be biased against certain racial or ethnic groups. In one embodiment, searches of information that is posted by users of social media can reveal observations, in textual, video, and/or audio form, that concern traffic enforcement activities, tickets, penalties, and the like. The traffic enforcement awareness server 130 can collect and analyze the social media information to add important insights and early-warning information to the data that is collected on enforcement. Social media information can provide immediate information about traffic enforcement conditions, whereas enforcement databases can be provide information regarding long term trends.

In one or more embodiments, the traffic enforcement awareness server 130 can collect footage from in-vehicle cameras 152. The in-vehicle video can provide images of traffic enforcement activities from the vantage point of both law enforcement and civilians. Officer body camera video can also be included. This video camera information can be incorporated into the big data picture of the traffic enforcement environment for a location.

In one or more embodiments, the traffic enforcement awareness server 130 collects emergency service scanner audio data. For example, publicly available scanner collection websites and social media sites can collect scanner audio data that captures audio communications between law enforcement personal and dispatches. Scanner information can be analyzed by the traffic enforcement awareness server 130 to construct the enforcement environment in real-time as well as to provide context for a historical enforcement context. In one example, the capture of real time or near real time scanner information can be used to determine if particular traffic enforcement activities are occurring or if a particular law enforcement officer is engaged in traffic enforcement. If the traffic enforcement awareness server 130 can determine, for example, that a pattern of aggressive traffic enforcement is associated with a particular officer patrolling a particular highway, then a scanner capture indicating the presence of this officer on duty can be flagged by the traffic enforcement awareness server 130 for notification to the driver of the vehicle 140.

In one or more embodiments, the traffic enforcement awareness server 130 can analyze the collected traffic enforcement information to generate one or more traffic enforcement categorizations or grades for the location. For example, the traffic enforcement awareness server 130 can categorize a driving location or jurisdiction engaging in aggressive enforcement, normal enforcement, or lax enforcement of posted speed limits. In another example, the traffic enforcement awareness server 130 can determine that a driving location appears to engage in profiling of certain types of vehicle or certain demographics of drivers. In another example, the traffic enforcement awareness server 130 can grade a jurisdiction as aggressive in enforcing seatbelt laws or setting up sobriety checkpoints. The grades of various driving locations can be developed on a relative basis, where each location is compared to other locations and reported based on how each specific location compares to the average location. The grades can be developed on an objective basis by comparing the actual enforcement to a national standard for enforcement, such as promulgated by a Federal agency, an insurance organization, or a law enforcement organization. The grading of locations, as well as exemplary data and video or audio examples from the big data collection at the traffic enforcement awareness server 130 database 135 can be generally presented via a website or a social media connection and can be made available to the driver at the vehicle 140 via a display device 153. The collection, analysis, and presentation of this information can provide a public service by providing independent oversight of jurisdiction for the public while providing a real-time point of reference to people driving their vehicles 140 in particular locations and jurisdictions.

In one or more embodiments, the system 100 can provide a mechanism for positive identification of the driver of vehicle 140. By positively identifying the driver, the traffic enforcement awareness server 130 can review the traffic enforcement environment at the driving location and select enforcement scenarios that are particularly relevant to the driver based on information specific to the driver. In one embodiment, the system 100 can use biometric data that has been associated with the driver to establish a positive identification. In one embodiment, the vehicle 140 can use a system to recognize a driver's fingerprint. For example, a fingerprint reader can be incorporated into a vehicle steering wheel 144 or another vehicle system, such as a touch screen display 153. The fingerprint reader can capture a digital image of the driver's finger print and compare this digital image to a stored image to positively identify the driver. The comparing step can be performed at the vehicle, or the captured digital image can be transmitted to the traffic enforcement awareness server 130 for identification. In one embodiment, the vehicle 140 can capture an image of the driver using a stand-alone, on-vehicle camera 152 or an on-vehicle camera that has been integrated into another vehicle component, such as a rear-view mirror 149 or a vanity mirror. The digital image of the user's face can be compared to a stored image to positively identify the driver. Once again, the comparing step can be performed at the vehicle, or the captured digital image can be transmitted to the traffic enforcement awareness server 130 for identification. In various embodiment, the captured image can be that of the driver's face, eye, retina, or any other singularly distinguishing feature.

In one or more embodiments, the driver can be positively identified using voice analysis. The vehicle 140 can capture a digital sample of the driver's voice using an on-vehicle microphone. The microphone can be a stand-alone device or can be integrated into another vehicle component or feature, such as an on-vehicle communication system or an entertainment system. The digital sample of the user's voice can be compared to a stored image to positively identify the driver. Once again, the comparing step can be performed at the vehicle, or the captured digital sample can be transmitted to the traffic enforcement awareness server 130 for identification.

In one or more embodiments, the driver can be positively identified using a password. The vehicle 140 can capture a driver's entering of a password via a keypad or via microphone. The keypad and/or microphone can be stand-alone devices or can be integrated into another vehicle component or feature, such as the on-vehicle communication system, entertainment system, and/or touch screen device 153. The password can be compared to a stored password to positively identify the driver. Once again, the comparing step can be performed at the vehicle, or at the traffic enforcement awareness server 130.

In one or more embodiments, positive identification of the driver can be performed, all or in part, using a wireless communication device 116 that is present in the vehicle 140. In various embodiments, the wireless communication device 116 can capture driver biometric information, such as a fingerprint, a facial image, or a voice password, or an entered password, and can pass this information to the vehicle 140 via a local wireless connection, such as a BlueTooth™ connection. In another embodiment, the wireless communication device execute a client application, which can verify the identification of the driver and/or transmit the identifying information to the traffic enforcement awareness server 130 for identification.

In one or more embodiments, the system 100 can include one or more features to insure that the person, who is identified as the driver, is, in fact the driver and not just a passenger in the vehicle 140. These "anti-spoof" features can be important is circumstances for enforcing certain notifications and/or operations controls for the vehicle 140 based on the identity of the driver. In one embodiment, a feature for capturing a fingerprint of the driver at, for example, a steering wheel 144 can be ergonomically located so as to make it difficult for anyone but the driver to provide the fingerprint sample. In another embodiment, the vehicle 140 can include a weighing mechanism in the passenger seat, such as can be used in a vehicle supplemental safety restraint system or air bag system. The vehicle 140 can access data from the weighing mechanism and use this data to verify a presumptive identification of the driver that is based on another identifier, such as a fingerprint, voice sample, image, or password.

In one or more embodiments, the system 100 can use a positive identification of the driver to provide driver-specific information to the driver. In one embodiment, the traffic enforcement awareness server 130 can us the positive identification to access a driver profile that is assigned to this driver. The driver profile can include specific identification information, such as an driver's operating license number and/or license type (e.g., commercial, non-commercial, school bus, trucking, hazardous materials, and/or young person's license). The driver profile can include demographic information about the driver (e.g., age, sex, race, weight, ethnicity, state or residence, state of birth, country of birth). The driver profile can include preferences, where the user can specify the types of traffic enforcement scenarios for which he/she wants to receive notifications or wants to filter out notifications.

In one embodiment, the driver profile can allow the traffic enforcement awareness server 130 to customize its search for traffic enforcement scenarios in the traffic enforcement environment that is generated via the big data analysis of the data that has been collected for the driving locations. In one embodiment, the driving profile can allow the traffic enforcement awareness server 130 to select which traffic enforcement scenarios result in notifications to the driver and how these notifications are presented in the vehicle 140. For example, a driver profile indicating that the driver is a young driver with a license that restricts the number of vehicle occupants and hours for driving can result in the traffic enforcement awareness server 130 searching specifically for local enforcement patterns related to the issues of occupant numbers and driving hours. In another example, the traffic enforcement awareness server 130 can use a driver's license number to search a database for infractions and/or infraction points that have accrued for this license number. If the driver is in danger of sanctions (e.g., loss of license) in the event of another traffic infraction, then the traffic enforcement awareness server 130 can increase its level of sensitivity in warning the driver about local enforcement patterns. For example, the traffic enforcement awareness server 130 could warn driver about any location that is not graded as "lax enforcement," or the traffic enforcement awareness server 130 can generate a verbal warning rather than a textual warning to better ensure that the driver is aware of a potential problem and takes corrective action. In another example, the traffic enforcement awareness server 130 can use a driver profile indicating that a first driver is an African American to trigger a search for special issues related to profiling in a driving location, while disregarding these issues for a second driver, whose profile does not indicate such a status.

In one or more embodiments, the vehicle 140 can also use the driver profile information to customize how the vehicle responds to notifications from the traffic enforcement awareness server 130. For example, a driver can indicate that he/she wants the traffic enforcement awareness server 130 to detect and report all instances of elevated traffic enforcement activities in a driving location. However, the driver only wants to be warned about enforcement directed to speed limits and vehicle load limits. Further, the driver wants a speed limit enforcement notification to generate an audio warning while a load limit notification generates a textual warning on a display. The driver profile can instruct the vehicle 100 to present the traffic enforcement information in these ways to provide the driver with the information that he/she desires. In one embodiment, the vehicle can integrate the traffic enforcement notifications from the traffic enforcement awareness server 130 into other vehicle monitoring and/or control processes. For example, the vehicle 100 can monitor one or more vehicle operation parameters, such as vehicle speed. In response to an indication from the traffic enforcement awareness server 130 that the vehicle is entering a zone of strict speed enforcement, the vehicle can present information about the current vehicle speed to augment information warning of strict enforcement. In one embodiment, the vehicle 100 can present the posted speed limit and the current vehicle speed to provide the driver with a real-time snapshot of how he/she is driving. In one embodiment, the vehicle can transmit a message to a third party device when the vehicle detects certain conditions related to vehicle operation. For example, the vehicle can transmit a message to a parent's mobile device when the vehicle detects operation of the vehicle above the posted speed limit, when the vehicle enters an area of strict traffic enforcement, or when operational information at the vehicle indicates that the driver is not heeding a warning from the traffic enforcement awareness server 130. In one embodiment, the traffic enforcement awareness server 130 can command the vehicle to initiate a shutting down if it appears that the driver is driving inappropriately with respect to the traffic enforcement conditions as indicated by the traffic enforcement awareness server 130 or is driving unlawfully.

In one or more embodiments, notifications of traffic enforcement scenarios from the traffic enforcement awareness server 130 can be presented to the driver via a wireless communication device 116. For example, if the vehicle enters a location with a traffic enforcement issue of concern to the driver (as indicated in the driver profile), then the traffic enforcement awareness server 130 can transmit a notification to a client application at the wireless communication device 116. The wireless communication device 116 can then produce appropriate audio, images, video, and/or vibrations to bring awareness of the notification to the attention of the driver.

In one or more embodiments, the vehicle 140 or a wireless communication device 116 at the vehicle can report vehicle operating information to the traffic enforcement awareness server 130. The traffic enforcement awareness server 130 can add this information to the traffic enforcement database 135 at the traffic enforcement awareness server 130 and use it to provide real-time context to the long-term data. For example, a grading of an area as "strictly enforcing" a speed limit can be further analyzed by the traffic enforcement awareness server 130 against the backdrop of current operating data from vehicles 140 that indicates how fast such vehicles are traveling at the location. The traffic enforcement awareness server 130 can provide information on the current average speed of other vehicles at the location to the vehicle 140.

In one or more embodiments, the system 100 can utilize devices on the vehicle 140, such as cameras 152, microphones 154, and/or other sensors, to monitor the driving environment around the vehicle 140. For example, the vehicle 140 can be equipped with multiple cameras 152 that provide an ability to capture video images from multiple vantage points. A dash mounted camera 152 can provide a view of the roadway in front of the vehicle 140. A bumper mounted camera 152 can capture the roadway behind the vehicle. Side mounted cameras 152 can capture the view to the left and right of the vehicle. A roof mounted camera 152 can capture a high-level, panoramic view of the roadway. One or more interior mounted cameras can capture images of the driver, the occupants, and/or critical vehicle information, such as the instrument panel. Multiple vehicle cameras 152 can provide a rich set of video images that, when combined, can paint a complete picture of the driving environment.

In one embodiment, vehicle cameras 152 can capture and document traffic enforcement activities. For example, video can capture images of traffic enforcement personnel engaged in vehicle stops, sobriety checkpoints, vehicle pursuits, and/or traffic/speed monitoring. These video images provide real-time information on traffic enforcement activities, which can be shared with the traffic enforcement awareness server 130. In another example, video images can provide real-time information on traffic levels and/or weather conditions that can be added to the database 135 of the traffic enforcement awareness server 130. In another embodiment, the video images can be used to document reckless behavior by drivers and/or law enforcement personnel. In one embodiment, video of a driver's instrument panel can be combined with traffic enforcement information at the traffic enforcement awareness server 130 to provide a "reality check" on enforcement activities against actual vehicles operations. In one embodiment, microphones 154 or other sensors (e.g., air quality sensors) can provide additional information on the driving environment. For example, microphones can detect law enforcement sirens or the sound of construction work. Data from these sensors can be added to the database at the traffic enforcement awareness server 130 to provide a more complete picture of the local driving conditions.

Figure 2:
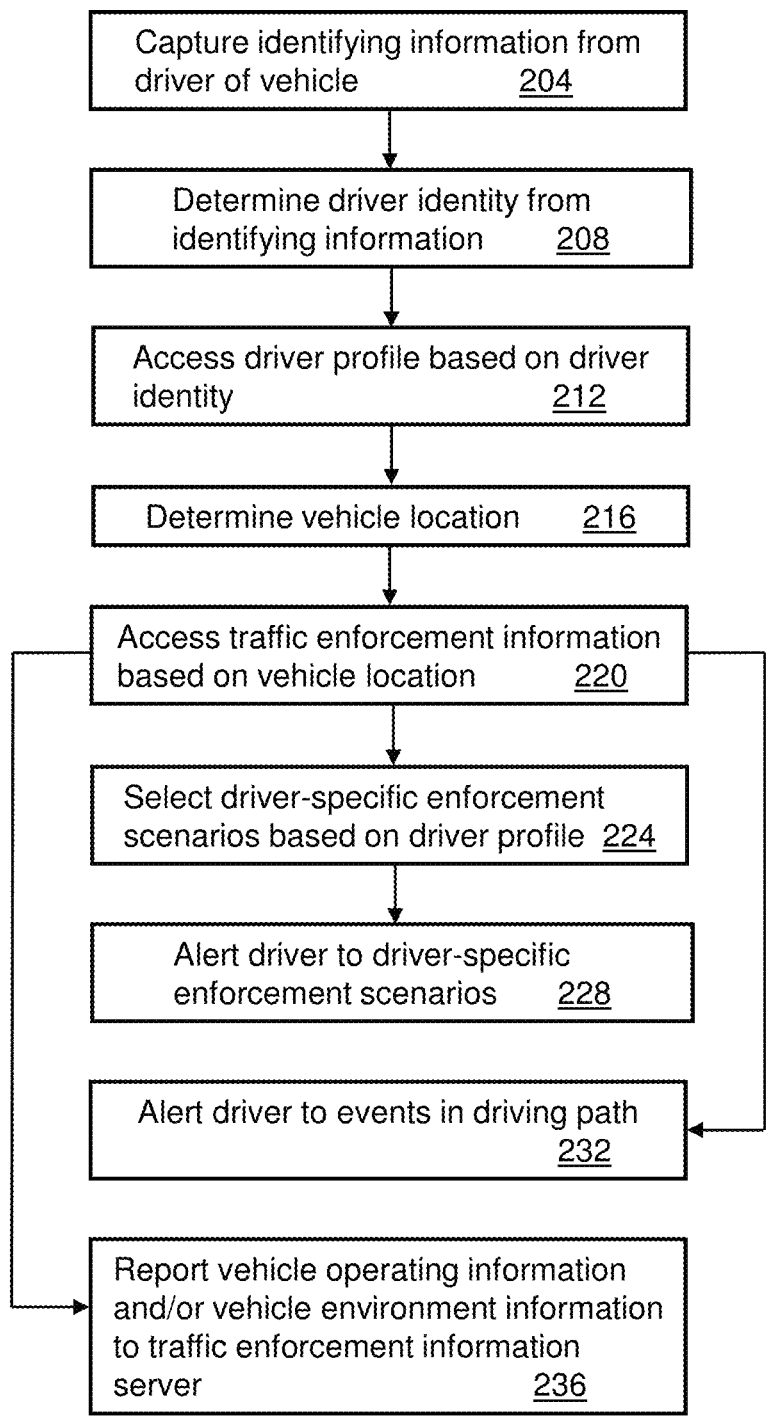
FIG. 2 depicts an illustrative embodiment of a method used in portions of the system described in FIGS. 1, 3, and 4.
Figure 3:
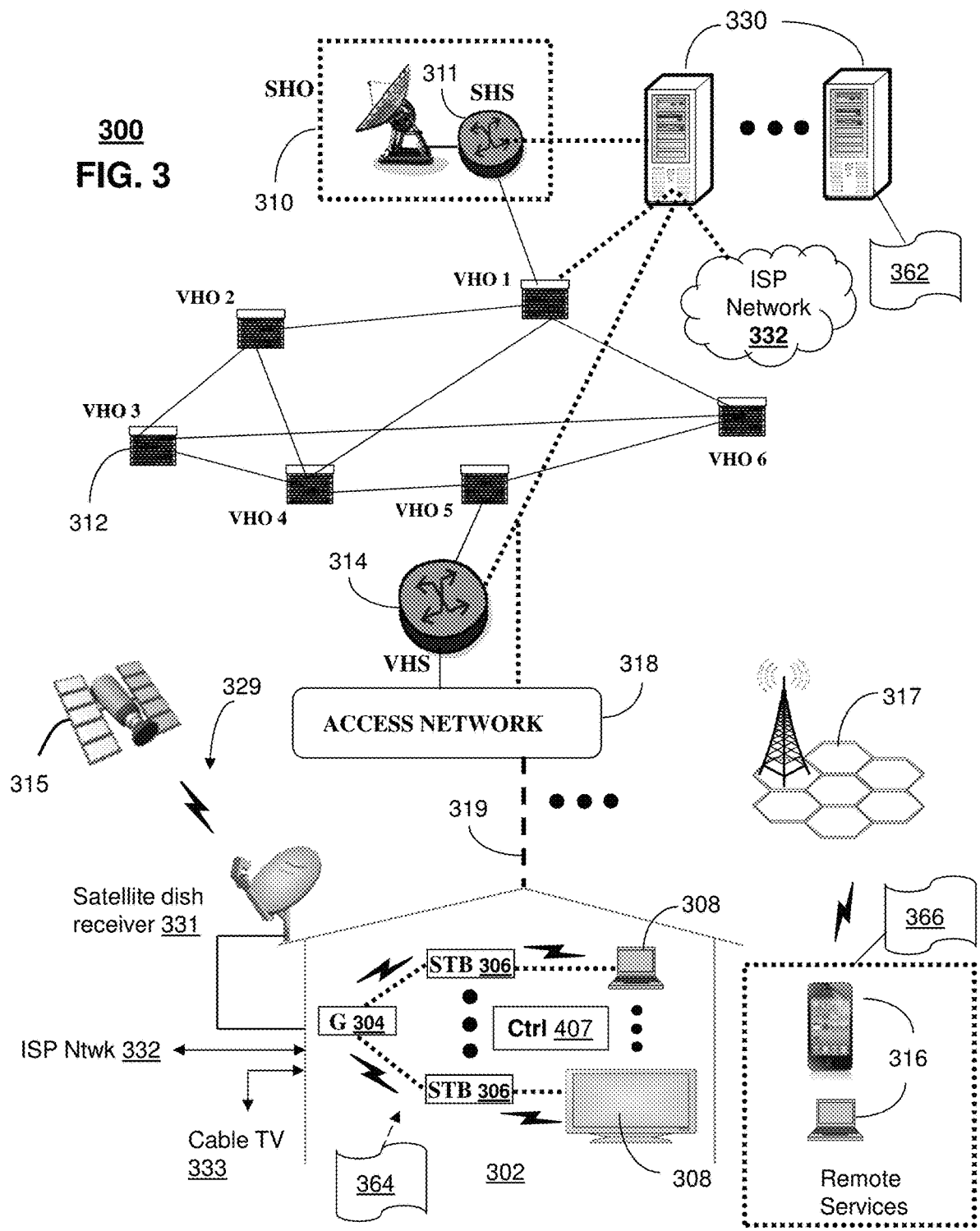
FIGS. 3 and 4 depict illustrative embodiments of communication systems that provide media services according to the embodiments illustrated in FIGS. 1 and 2.
Figure 4:
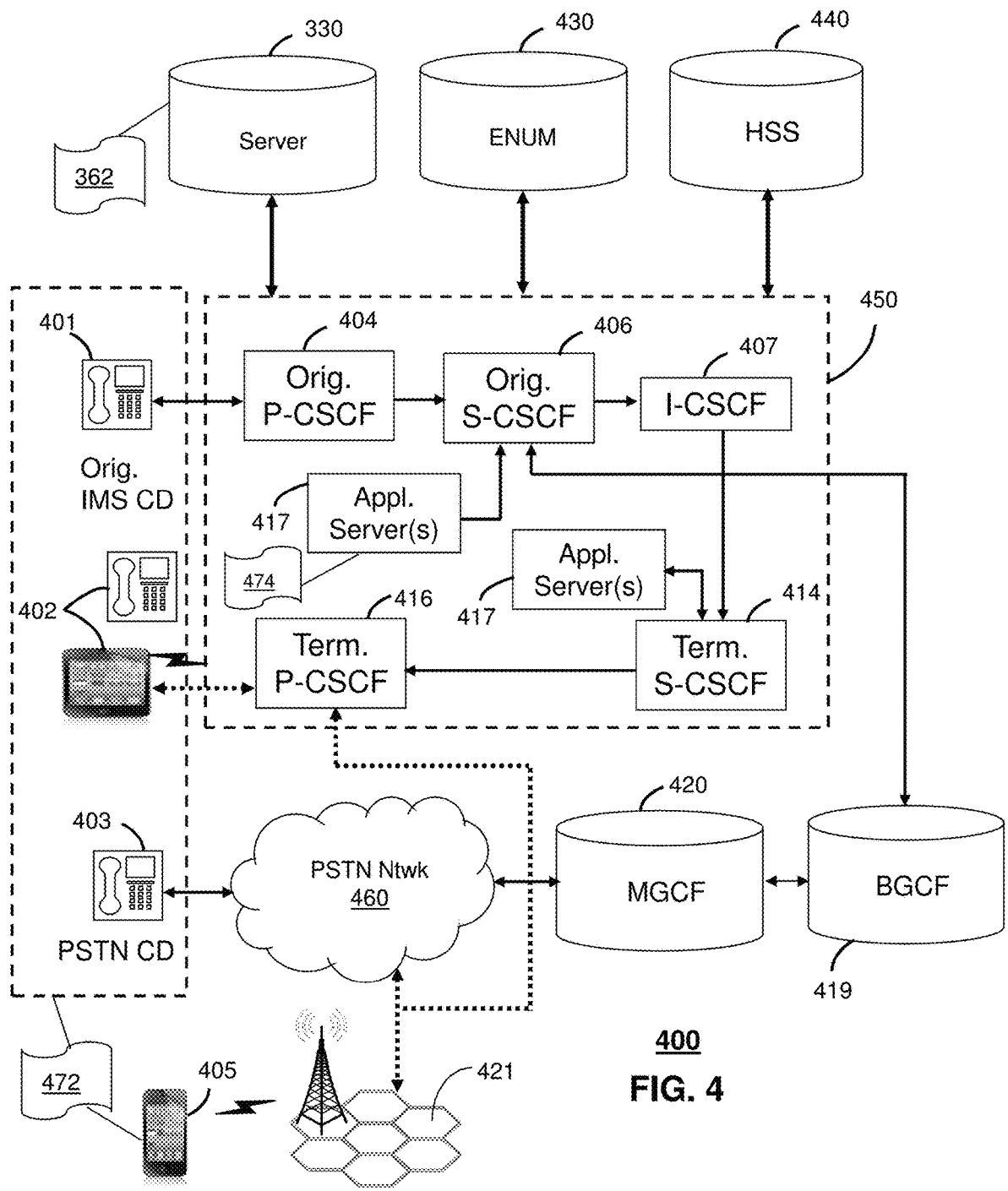

FIG. 2 depicts an illustrative embodiment of a method used in portions of the system described in FIGS. 1, 3, and 4. In particular, FIG. 2 shows illustrative embodiments of a method 200 for providing traffic enforcement information to a vehicle 140 via an IMS network 150.

In step 204, the system 100 captures identifying information from a driver of the vehicle 140. In one embodiment, the system 100 can use biometric data that has been associated with the driver to establish a positive identification. For example, a fingerprint image, facial image, eye or retinal image, or a voice sample can be captured by the system. In one embodiment, the system 100 can use a driver-specific identifier, such as a password. The vehicle 140 can include features for capturing the identifying information, or this information can be captured by a wireless communication device 116 executing a client application at the vehicle 140.

In step 208, the system 100 can determine a driver identity from the identifying information. In one embodiment, the biometric information can be analyzed and matched to known samples to positively determine the driver identity. In another embodiment, a word or code can be compared to a secret password or passcode to positively identify the driver. The identification can be performed by the vehicle 140, by a wireless communication device 116 operating a client application at the vehicle, or by a traffic enforcement awareness server 130 that is remote from the vehicle.

In step 212, the system 100 can access a driver profile based on the driver identity. In one embodiment, the driver profile can include specific identifying information (e.g., operator's license number) demographic information (e.g., age, race, sex), and usage preferences (e.g., how and what to present). The traffic enforcement awareness server 130, the vehicle 140, and/or the wireless communication device 116 can use the driver profile to customize performance of searching and presenting of traffic enforcement information.

In step 216, the system 100 can determine the location of the vehicle 140. In one embodiment, the vehicle location can be determined by accessing information from a GPS satellite. In one embodiment, the vehicle location can be determined by triangulating from locations of known structures, such as mobile base stations 117A-117C, based on signal strength.

In step 220, the system 100 can access traffic enforcement information based on the vehicle location. In one embodiment, the traffic enforcement awareness server 130 can search traffic enforcement data based on the vehicle location to determine the local traffic enforcement environment. In step 224, the system 100 can select driver-specific enforcement scenarios based on the driver identity. In one embodiment, information in driver profile can be used to select enforcement scenarios that are most relevant to the driver's licensing type and status, demographics, and/or preferences.

In step 228, the system 100 can alert the driver of the driver-specific scenarios that the driver for which the driver should be aware (and take corrective actions). In one embodiment, the traffic enforcement awareness server 130 can determine how the driver is alerted according to the driver profile. In one embodiment, the vehicle 140 or the wireless communication device 116 (if used) determine how to alert the driver according to the driver profile.

In step 232, the system 100 can alert the driver of events in the driving path. In one embodiment, the traffic enforcement awareness server 130 can transmit an alert based on information about current enforcement activities. In step 236, the system 100 can report vehicle operating information or environmental information to the traffic enforcement awareness server 130. In one embodiment, the vehicle operating parameters, such as speed, can be reported to the traffic enforcement awareness server 130. In one embodiment, the vehicle can transmit information on the current traffic conditions and/or traffic enforcement activities that are captured from vehicle cameras.

While for purposes of simplicity of explanation, the respective processes are shown and described as a series of blocks in FIG. 2, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

FIG. 3 depicts an illustrative embodiment of a first communication system 300 for delivering media content. The communication system 300 can represent an Internet Protocol Television (IPTV) media system. Communication system 300 can be overlaid or operably coupled with the system 100 of FIG. 1 as another representative embodiment of communication system 300. For instance, one or more devices illustrated in the communication system 300 of FIG. 3 can include a mobile communication device 116, a satellite 115, a wireless access base station 117a, or a traffic information server 130, as depicted in FIG. 1.

The IPTV media system can include a super head-end office (SHO) 310 with at least one super headend office server (SHS) 311 which receives media content from satellite and/or terrestrial communication systems. In the present context, media content can represent, for example, audio content, moving image content such as 2D or 3D videos, video games, virtual reality content, still image content, and combinations thereof. The SHS server 311 can forward packets associated with the media content to one or more video head-end servers (VHS) 314 via a network of video head-end offices (VHO) 312 according to a multicast communication protocol.

The VHS 314 can distribute multimedia broadcast content via an access network 318 to commercial and/or residential buildings 302 housing a gateway 304 (such as a residential or commercial gateway). The access network 318 can represent a group of digital subscriber line access multiplexers (DSLAMs) located in a central office or a service area interface that provide broadband services over fiber optical links or copper twisted pairs 319 to buildings 302. The gateway 304 can use communication technology to distribute broadcast signals to media processors 306 such as Set-Top Boxes (STBs) which in turn present broadcast channels to media devices 308 such as computers or television sets managed in some instances by a media controller 307 (such as an infrared or RF remote controller).

The gateway 304, the media processors 306, and media devices 308 can utilize tethered communication technologies (such as coaxial, powerline or phone line wiring) or can operate over a wireless access protocol such as Wireless Fidelity (WiFi), Bluetooth®, Zigbee®, or other present or next generation local or personal area wireless network technologies. By way of these interfaces, unicast communications can also be invoked between the media processors 306 and subsystems of the IPTV media system for services such as video-on-demand (VoD), browsing an electronic programming guide (EPG), or other infrastructure services.

A satellite broadcast television system 329 can be used in the media system of FIG. 3. The satellite broadcast television system can be overlaid, operably coupled with, or replace the IPTV system as another representative embodiment of communication system 300. In this embodiment, signals transmitted by a satellite that include media content can be received by a satellite dish receiver 331 coupled to the building 302. Modulated signals received by the satellite dish receiver 331 can be transferred to the media processors 306 for demodulating, decoding, encoding, and/or distributing broadcast channels to the media devices 308. The media processors 306 can be equipped with a broadband port to an Internet Service Provider (ISP) network 332 to enable interactive services such as VoD and EPG as described above.

In yet another embodiment, an analog or digital cable broadcast distribution system such as cable TV system 333 can be overlaid, operably coupled with, or replace the IPTV system and/or the satellite TV system as another representative embodiment of communication system 300. In this embodiment, the cable TV system 333 can also provide Internet, telephony, and interactive media services. System 300 enables various types of interactive television and/or services including IPTV, cable and/or satellite.

The subject disclosure can apply to other present or next generation over-the-air and/or landline media content services system.

Some of the network elements of the IPTV media system can be coupled to one or more computing devices 330, a portion of which can operate as a web server for providing web portal services over the ISP network 332 to wireline media devices 308 or wireless communication devices 316.

Communication system 300 can also provide for all or a portion of the computing devices 330 to function as a traffic enforcement information server 330. For example, the traffic enforcement information server 330 can use computing and communication technology to perform function 362, which can include among other things, collecting and storing traffic enforcement information, providing searchable access to the traffic enforcement information according to vehicle location and driver profile, and providing driver-specific enforcement scenarios for the vehicle location and driver profile, which can be relayed to the driver to provide awareness of traffic enforcement issues, as described by system 100 and method 200 of FIGS. 1-2. For instance, function 362 of the traffic enforcement information server 330 can be similar to the functions described for the traffic enforcement server 130 of FIG. 1 in accordance with method 200 of FIG. 2. The media processors 306 and wireless communication devices 316 can be provisioned with software functions 364 and 366, respectively, to utilize the services of traffic enforcement information server 330. For instance, functions 364 and 366 of media processors 306 and wireless communication devices 316 can be similar to the functions described for the mobile communication device 116 of FIG. 1 in accordance with method 200 of FIG. 2.

Multiple forms of media services can be offered to media devices over landline technologies such as those described above. Additionally, media services can be offered to media devices by way of a wireless access base station 317 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

The system 300 can determine a driver identity for a driver of a vehicle 140 and, in turn, retrieve a driver profile according to the driver identity. The system 300 determining a vehicle location. The system 100 can access traffic enforcement information that is associated with the vehicle location from a traffic enforcement information server 330 and, in turn, can select a driver-specific enforcement scenario from the traffic enforcement information server 330 for the vehicle location according to the driver profile. The system 300 can transmit a notification corresponding to the driver-specific enforcement scenario and, in turn, present an in-vehicle alert to convey the notification to the driver.

FIG. 4 depicts an illustrative embodiment of a communication system 400 employing an IP Multimedia Subsystem (IMS) network architecture to facilitate the combined services of circuit-switched and packet-switched systems. Communication system 400 can be overlaid or operably coupled with system 100 of FIG. 1 and communication system 300 as another representative embodiment of communication system 300.

Communication system 400 can comprise a Home Subscriber Server (HSS) 440, a tElephone NUmber Mapping (ENUM) server 430, and other network elements of an IMS network 450. The IMS network 450 can establish communications between IMS-compliant communication devices (CDs) 401, 402, Public Switched Telephone Network (PSTN) CDs 403, 405, and combinations thereof by way of a Media Gateway Control Function (MGCF) 420 coupled to a PSTN network 460. The MGCF 420 need not be used when a communication session involves IMS CD to IMS CD communications. A communication session involving at least one PSTN CD may utilize the MGCF 420.

IMS CDs 401, 402 can register with the IMS network 450 by contacting a Proxy Call Session Control Function (P-CSCF) which communicates with an interrogating CSCF (I-CSCF), which in turn, communicates with a Serving CSCF (S-CSCF) to register the CDs with the HSS 440. To initiate a communication session between CDs, an originating IMS CD 401 can submit a Session Initiation Protocol (SIP INVITE) message to an originating P-CSCF 404 which communicates with a corresponding originating S-CSCF 406. The originating S-CSCF 406 can submit the SIP INVITE message to one or more application servers (ASs) 417 that can provide a variety of services to IMS subscribers.

For example, the application servers 417 can be used to perform originating call feature treatment functions on the calling party number received by the originating S-CSCF 406 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 406 can submit queries to the ENUM system 430 to translate an E.164 telephone number in the SIP INVITE message to a SIP Uniform Resource Identifier (URI) if the terminating communication device is IMS-compliant. The SIP URI can be used by an Interrogating CSCF (I-CSCF) 407 to submit a query to the HSS 440 to identify a terminating S-CSCF 414 associated with a terminating IMS CD such as reference 402. Once identified, the I-CSCF 407 can submit the SIP INVITE message to the terminating S-CSCF 414. The terminating S-CSCF 414 can then identify a terminating P-CSCF 416 associated with the terminating CD 402. The P-CSCF 416 may then signal the CD 402 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 4 may be interchangeable. It is further noted that communication system 400 can be adapted to support video conferencing. In addition, communication system 400 can be adapted to provide the IMS CDs 401, 402 with the multimedia and Internet services of communication system 300 of FIG. 3.

If the terminating communication device is instead a PSTN CD such as CD 403 or CD 405 (in instances where the cellular phone only supports circuit-switched voice communications), the ENUM system 430 can respond with an unsuccessful address resolution which can cause the originating S-CSCF 406 to forward the call to the MGCF 420 via a Breakout Gateway Control Function (BGCF) 419. The MGCF 420 can then initiate the call to the terminating PSTN CD over the PSTN network 460 to enable the calling and called parties to engage in voice and/or data communications.

It is further appreciated that the CDs of FIG. 4 can operate as wireline or wireless devices. For example, the CDs of FIG. 4 can be communicatively coupled to a cellular base station 421, a femtocell, a WiFi router, a Digital Enhanced Cordless Telecommunications (DECT) base unit, or another suitable wireless access unit to establish communications with the IMS network 450 of FIG. 4. The cellular access base station 421 can operate according to common wireless access protocols such as GSM, CDMA, TDMA, UMTS, WiMax, SDR, LTE, and so on. Other present and next generation wireless network technologies can be used by one or more embodiments of the subject disclosure. Accordingly, multiple wireline and wireless communication technologies can be used by the CDs of FIG. 4.

Cellular phones supporting LTE can support packet-switched voice and packet-switched data communications and thus may operate as IMS-compliant mobile devices. In this embodiment, the cellular base station 421 may communicate directly with the IMS network 450 as shown by the arrow connecting the cellular base station 421 and the P-CSCF 416.

Alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS, the ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

The traffic enforcement information server 330 of FIG. 3 can be operably coupled to communication system 400 for purposes similar to those described above. The traffic enforcement information server 330 can perform function 362 and thereby provide traffic enforcement awareness services to the CDs 401, 402, 403 and 405 of FIG. 4, which are similar to the functions described for server 100 of FIG. 1 in accordance with method 200 of FIG. 2. CDs 401, 402, 403 and 405, which can be adapted with software to perform function 472 to utilize the services of the traffic enforcement information server 330, which are also similar to the functions described for communication devices 116 of FIG. 1 in accordance with method 200 of FIG. 2. The traffic enforcement information server 330 can be an integral part of the application server(s) 417 performing function 474, which can be substantially similar to function 362 and adapted to the operations of the IMS network 450.

For illustration purposes only, the terms S-CSCF, P-CSCF, I-CSCF, and so on, can be server devices, but may be referred to in the subject disclosure without the word "server." It is also understood that any form of a CSCF server can operate in a device, system, component, or other form of centralized or distributed hardware and software. It is further noted that these terms and other terms such as DIAMETER commands are terms can include features, methodologies, and/or fields that may be described in whole or in part by standards bodies such as $3^{rd}$ Generation Partnership Project (3GPP). It is further noted that some or all embodiments of the subject disclosure may in whole or in part modify, supplement, or otherwise supersede final or proposed standards published and promulgated by 3GPP.

Figure 5:
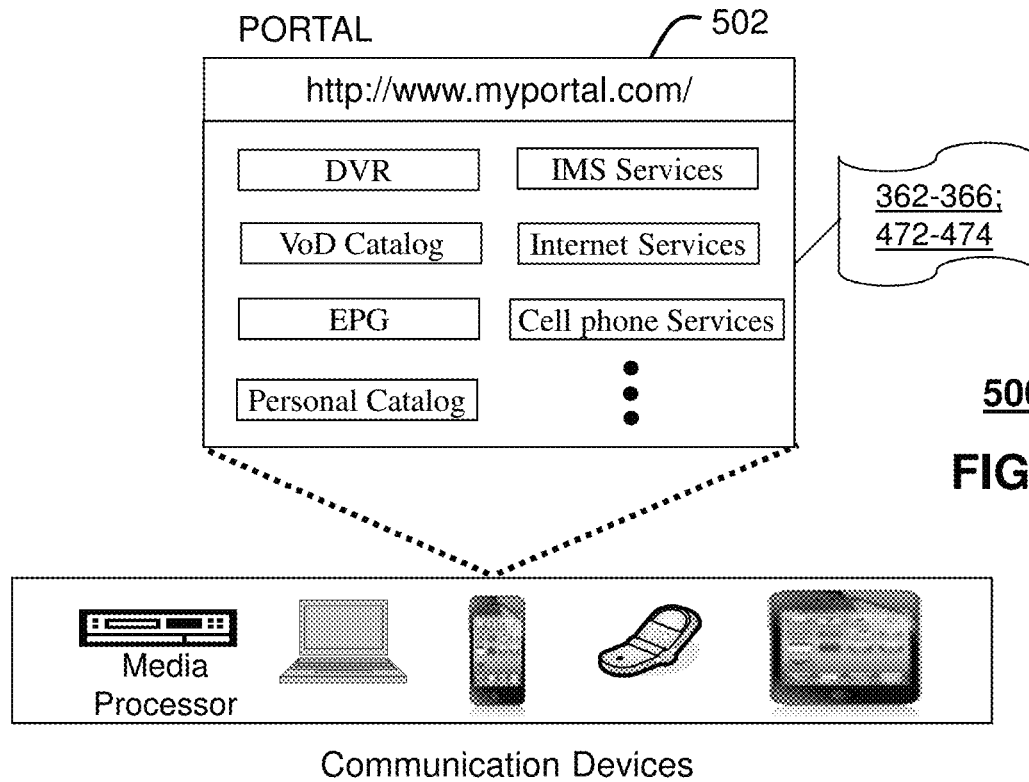
FIG. 5 depicts an illustrative embodiment of a web portal for interacting with the communication systems of FIGS. 1, 3, and 4.

FIG. 5 depicts an illustrative embodiment of a web portal 502 of a communication system 500. Communication system 500 can be overlaid or operably coupled with system 100 of FIG. 1, communication system 300, and/or communication system 400 as another representative embodiment of system 100 of FIG. 1, communication system 300, and/or communication system 400. The web portal 502 can be used for managing services of system 100 of FIG. 1 and communication systems 300 and 400. A web page of the web portal 502 can be accessed by a Uniform Resource Locator (URL) with an Internet browser using an Internet-capable communication device such as those described in FIGS. 1, 3, and 4. The web portal 502 can be configured, for example, to access a media processor 306 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 306. The web portal 502 can also be used for provisioning IMS services described earlier, provisioning Internet services, provisioning cellular phone services, and so on.

The web portal 502 can further be utilized to manage and provision software applications 362-366, and 472-474 to adapt these applications as may be desired by subscribers and/or service providers of system 100 of FIG. 1 and communication systems 300 and 400. For instance, users of the traffic enforcement information services provided by server 130 or server 330 can log into their on-line accounts and provision server 130 or server 330 to edit driver profile information, such as preference information describing types of traffic enforcement scenarios, which the user would like to see or would like to avoid seeing while driving a vehicle 140. A user might also log into an account to provide or edit contact information at a traffic enforcement server 130 to enable it to communication with devices described in FIGS. 1, 3, and 4. Service providers can log onto an administrator account to provision, monitor and/or maintain the system 100 of FIG. 1 or a traffic enforcement server 130.

Figure 6:
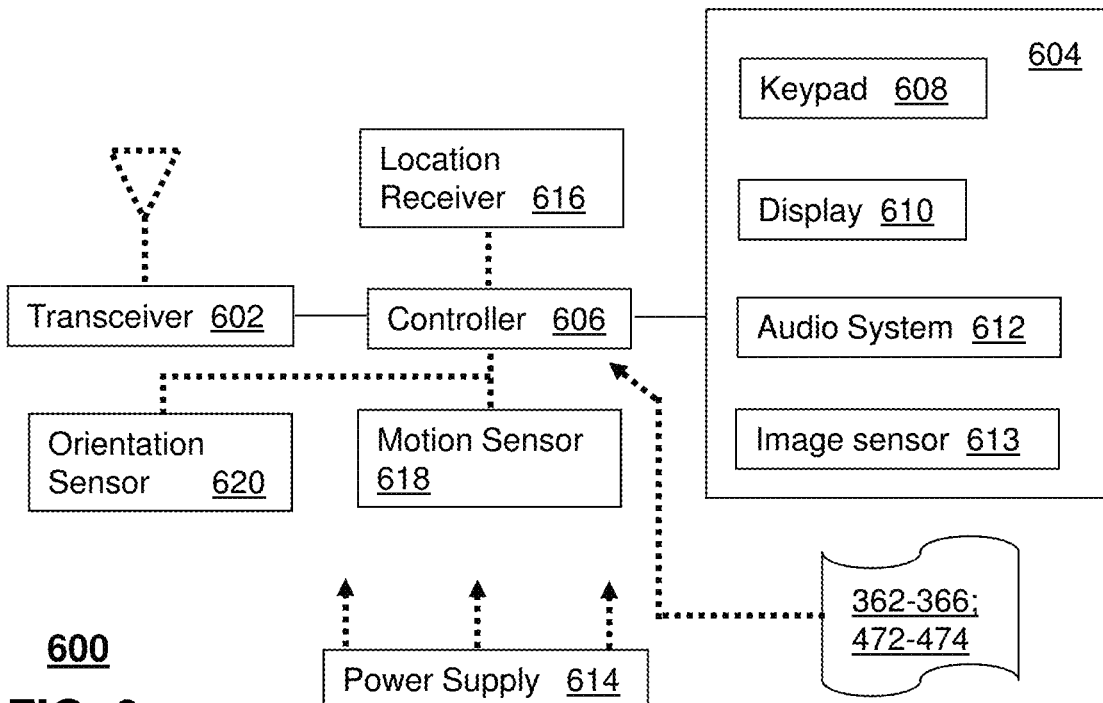
FIG. 6 depicts an illustrative embodiment of a communication device.

FIG. 6 depicts an illustrative embodiment of a communication device 600. Communication device 600 can serve in whole or in part as an illustrative embodiment of the devices depicted in FIGS. 1, 3, and 4 and can be configured to perform portions of method 200 of FIG. 2. For example, the communication device 600 can serve as an illustrative embodiment of the vehicle 140 of FIG. 1.

Communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface with graphical user interface (GUI) elements that can be selected by a user with a touch of a finger. The touch screen display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable applications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a reset button (not shown). The reset button can be used to reset the controller 606 of the communication device 600. In yet another embodiment, the communication device 600 can also include a factory default setting button positioned, for example, below a small hole in a housing assembly of the communication device 600 to force the communication device 600 to re-establish factory settings. In this embodiment, a user can use a protruding object such as a pen or paper clip tip to reach into the hole and depress the default setting button. The communication device 600 can also include a slot for adding or removing an identity module such as a Subscriber Identity Module (SIM) card. SIM cards can be used for identifying subscriber services, executing programs, storing subscriber data, and so forth.

The communication device 600 as described herein can operate with more or less of the circuit components shown in FIG. 6. These variant embodiments can be used in one or more embodiments of the subject disclosure.

The communication device 600 can be adapted to perform the functions of devices of FIG. 1, the media processor 306, the media devices 308, or the portable communication devices 316 of FIG. 3, as well as the IMS CDs 401-402 and PSTN CDs 403-405 of FIG. 4. It will be appreciated that the communication device 600 can also represent other devices that can operate in the system of FIG. 1 and the communication systems 300 and 400 of FIGS. 3-4, such as a gaming console and a media player. In addition, the controller 606 can be adapted in various embodiments to perform the functions 362-366 and 472-474, respectively.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 7:
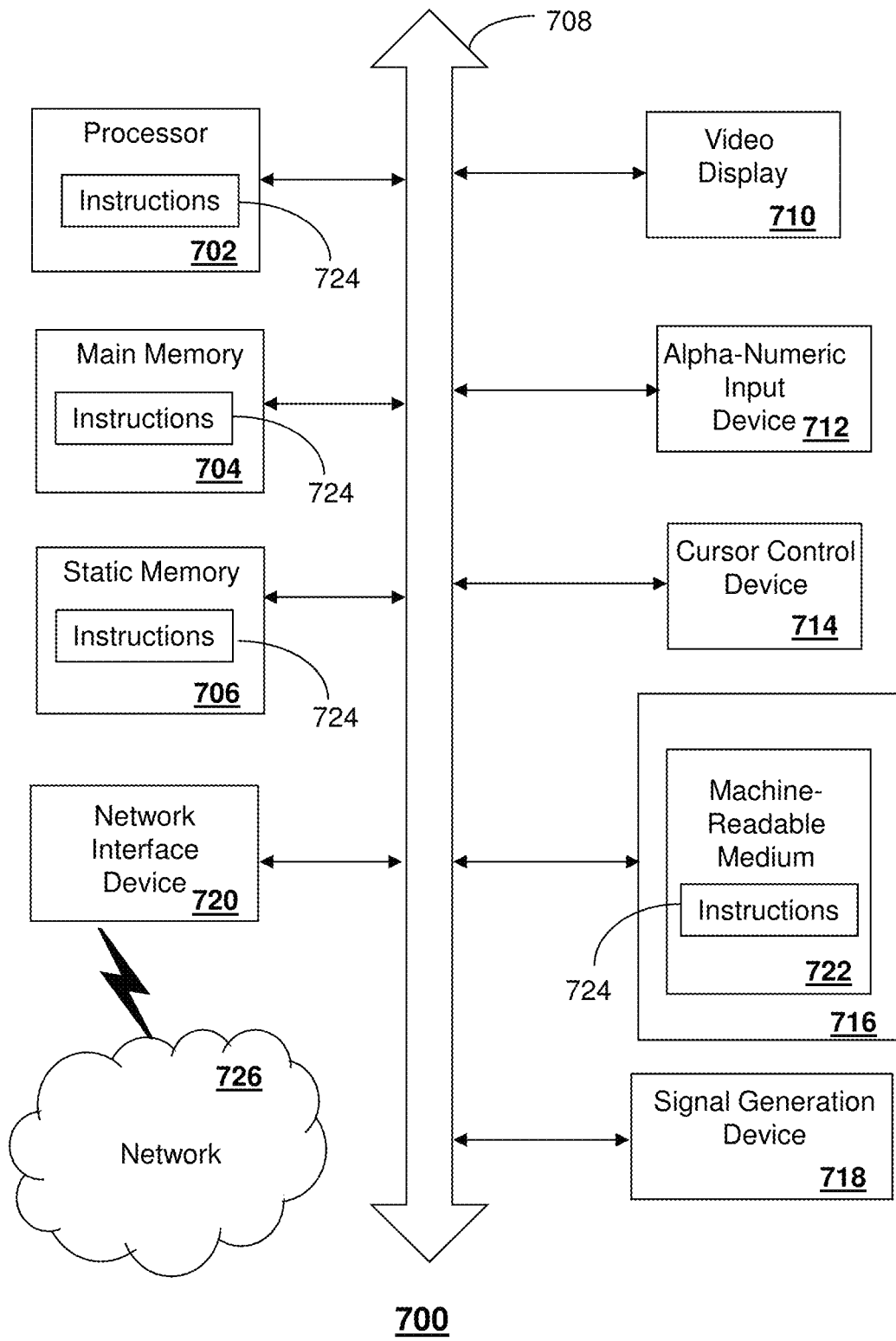
FIG. 7 is a diagrammatic representation of a machine in the form of a computer system within which a set of instructions, when executed, may cause the machine to perform any one or more of the methods described herein.

FIG. 7 depicts an exemplary diagrammatic representation of a machine in the form of a computer system 700 within which a set of instructions, when executed, may cause the machine to perform any one or more of the methods described above. One or more instances of the machine can operate, for example, as a traffic enforcement information server 130, a media processor 306, a wireless communication devices 116, or another device of FIGS. 1, 4, and 5. In some embodiments, the machine may be connected (e.g., using a network 726) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 700 may include a processor (or controller) 702 (e.g., a central processing unit (CPU)), a graphics processing unit (GPU, or both), a main memory 704 and a static memory 706, which communicate with each other via a bus 708. The computer system 700 may further include a display unit 710 (e.g., a liquid crystal display (LCD), a flat panel, or a solid state display). The computer system 700 may include an input device 712 (e.g., a keyboard), a cursor control device 714 (e.g., a mouse), a disk drive unit 716, a signal generation device 718 (e.g., a speaker or remote control) and a network interface device 720. In distributed environments, the embodiments described in the subject disclosure can be adapted to utilize multiple display units 710 controlled by two or more computer systems 700. In this configuration, presentations described by the subject disclosure may in part be shown in a first of the display units 710, while the remaining portion is presented in a second of the display units 710.

The disk drive unit 716 may include a tangible computer-readable storage medium 722 on which is stored one or more sets of instructions (e.g., software 724) embodying any one or more of the methods or functions described herein, including those methods illustrated above. The instructions 724 may also reside, completely or at least partially, within the main memory 704, the static memory 706, and/or within the processor 702 during execution thereof by the computer system 700. The main memory 704 and the processor 702 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 722 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 700.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A device comprising:
a processing system including a processor; and
a memory that stores executable instructions that, when executed by the processing system, facilitate performance of operations comprising:
identifying an occupant of a vehicle as a driver of the vehicle;
retrieving a profile associated with the driver;
determining a current driving location of the vehicle;
detecting an event in a driving path of the vehicle, the event associated with the driving location of the vehicle and external to the vehicle;
accessing traffic enforcement information associated with the driving location to detect a pattern of traffic enforcement associated with the driving location;
determining, based on the profile, a potential law enforcement activity with respect to the driver;
adjusting, based on the determining, a sensitivity level for alerting the driver regarding the pattern, resulting in an adjusted sensitivity level;
generating, based on the pattern, a traffic enforcement grade for the driving location;
obtaining event information regarding the event, the event information comprising real-time video images regarding a traffic enforcement activity at the driving location, the video images captured using equipment of the vehicle; and
transmitting an alert, in accordance with the profile and the adjusted sensitivity level, to notify the driver regarding the event, the alert including the traffic enforcement grade.

2. The device of claim 1, wherein the law enforcement activity with respect to the driver comprises a sanction against the driver.

3. The device of claim 2, wherein the operations further comprise selecting a driver-specific enforcement scenario from the traffic enforcement information.

4. The device of claim 1, wherein the identifying further comprises verifying that the occupant of the vehicle is the driver.

5. The device of claim 3, wherein the driver-specific enforcement scenario is further selected according to the event.

6. The device of claim 3, wherein the operations further comprise receiving a vehicle operating parameter from the vehicle, and wherein the driver-specific enforcement scenario is further selected according to the vehicle operating parameter.

7. The device of claim 1, wherein the operations further comprise receiving environmental information associated with the vehicle.

8. The device of claim 1, wherein the identifying comprises obtaining biometric information associated with the occupant of the vehicle.

9. The device of claim 1, wherein the alert is presented via equipment integral with the vehicle.

10. The device of claim 1, wherein the operations further comprise obtaining monitoring information captured at the vehicle via equipment integral with the vehicle and comprising a camera, a microphone or a combination thereof.

11. A non-transitory machine-readable medium comprising executable instructions that, when executed by a processing system including a processor, facilitate performance of operations comprising:

identifying an occupant of a vehicle as a driver of the vehicle, the identifying based at least in part on monitoring information captured at the vehicle via equipment integral with the vehicle;

retrieving a profile associated with the driver;

determining a driving location of the vehicle;

detecting an event in a driving path of the vehicle, the event associated with the driving location of the vehicle and external to the vehicle;

accessing traffic enforcement information associated with the driving location to detect a pattern of traffic enforcement associated with the driving location;

determining, based on the profile, a potential law enforcement activity with respect to the driver;

adjusting, based on the determining, a sensitivity level for alerting the driver regarding the pattern, resulting in an adjusted sensitivity level;

generating, based on the pattern, a traffic enforcement grade for the driving location;

obtaining event information regarding the event, the event comprising a traffic enforcement activity, the event information comprising real-time video images captured using the equipment; and transmitting an alert, in accordance with the profile and the adjusted sensitivity level, to notify the driver regarding the event, the alert including the traffic enforcement grade.

12. The non-transitory machine-readable medium of claim 11, wherein the operations further comprise:

selecting a driver-specific enforcement scenario from the traffic enforcement information.

13. The non-transitory machine-readable medium of claim 12, wherein the operations further comprise receiving a vehicle operating parameter from the vehicle, and wherein the driver-specific enforcement scenario is further selected according to the vehicle operating parameter.

14. The non-transitory machine-readable medium of claim 11, wherein the alert is presented via the equipment integral with the vehicle.

15. The non-transitory machine-readable medium of claim 11, wherein the monitoring information is captured by a camera, a microphone or a combination thereof.

16. A method comprising:

identifying, by a processing system including a processor, an occupant of a vehicle as a driver of the vehicle;

retrieving, by the processing system, a profile associated with the driver;

determining, by the processing system, a driving location of the vehicle;

detecting, by the processing system, an event in a driving path of the vehicle, the event associated with the driving location of the vehicle and external to the vehicle;

accessing, by the processing system, traffic enforcement information associated with the driving location to detect a pattern of traffic enforcement associated with the driving location;

determining, by the processing system based on the profile, a potential law enforcement activity with respect to the driver;

adjusting, by the processing system based on the determining, a sensitivity level for alerting the driver regarding the pattern, resulting in an adjusted sensitivity level;

generating, by the processing system based on the pattern, a traffic enforcement grade for the driving location;

obtaining, by the processing system, event information regarding the event, the event information comprising real-time video images regarding a traffic enforcement activity, the video images captured using equipment of the vehicle; and transmitting, by the processing system in accordance with the profile and the adjusted sensitivity level, an alert regarding the event, wherein the alert is presented via equipment integral with the vehicle, the alert including the traffic enforcement grade.

17. The method of claim 16, wherein the identifying comprises obtaining biometric information associated with the occupant of the vehicle.

18. The method of claim 16, further comprising:

selecting, by the processing system, a driver-specific enforcement scenario from the traffic enforcement information.

19. The method of claim 16, wherein the traffic enforcement information comprises information obtained via a social media service.

20. The method of claim 18, further comprising receiving, by the processing system, a vehicle operating parameter from the vehicle, and wherein the driver-specific enforcement scenario is further selected according to the vehicle operating parameter.

* * * * *